(No Model.)

W. C. MOORE.
CULTIVATOR.

No. 485,705. Patented Nov. 8, 1892.

Witnesses:
Lee P. Orr
Will D Beacham

Inventor:
Waverly C. Moore

UNITED STATES PATENT OFFICE.

WAVERLY C. MOORE, OF GREER'S DEPOT, SOUTH CAROLINA.

CULTIVATOR.

SPECIFICATION forming part of Letters Patent No. 485,705, dated November 8, 1892.

Application filed December 7, 1891. Serial No. 414,344. (No model.)

*To all whom it may concern:*

Be it known that I, WAVERLY C. MOORE, of Greer's Depot, in the county of Greenville, in the State of South Carolina, have invented certain new and Improved Features to be Used in the Construction of Plows or Cultivators; and I do hereby declare that the following is a full and exact description thereof, reference being had to the accompanying drawings, and to the letters of reference marked thereon.

The nature of my invention consists in providing a bar of metal of suitable size and shape, and to the rear end of which is attached handles, and to the forward end of which is attached any suitable draft device, and which is at regular intervals pierced by bolt-holes, so that S-shaped side beams or bars may be fastened at their forward ends by two bolts to the main beam either abreast or one in the rear of the other diagonally, they being short and of equal length. To the rear end of each is attached a circular doubled bar of metal or foot, these beams being held in relation to each other by rods passing through and fastening by nuts, thereby holding the beams and feet the required distance apart and the plowshare or shovel that are attached to their lower ends in proper position for work.

To enable others skilled in the art to make and use my invention, I will proceed to give a detailed description of its construction and operation, reference being had to the accompanying drawings and letters of reference marked thereon.

Figure 1 represents a side view of my cultivator with all the beams and feet attached. Fig. 2 represents a top view of same, showing the position of the adjusting-rods E when used as a side harrow, threads being cut well down on each end of the rods, so that the nuts can be run up or down to change the distance between the beams, the side beam *c* being sufficiently elastic for that purpose, being rigidly fastened by bolts C' C' at the forward end to the main beam *a*, Fig. 3, and to the rear end of which is attached the foot *d*, Figs. 5 and 6, by bolts through holes *h' h'*, Fig. 5, as shown in Fig. 2.

Figure 4:
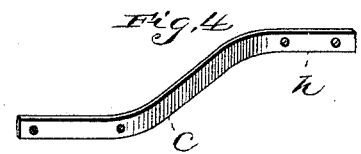
Fig. 4 shows one of the side beams detached, which is a flat bar of metal S-shaped and with two holes equal distant in each end.
Figure 5:
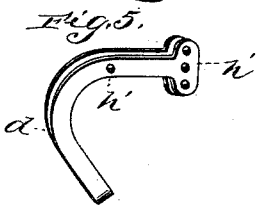

Fig. 5 represents a side view of one of the feet *d*, which is made by doubling a bar of metal on itself so as to leave a space of about half an inch between and shaping like a hook, as shown, and drilling-holes *h' h'* opposite, so as to fit those in the side beam, Fig. 4, the front of the bars being spread, so as to receive two or three holes, allowing a different adjustment of pitch in the foot.

Figure 1:
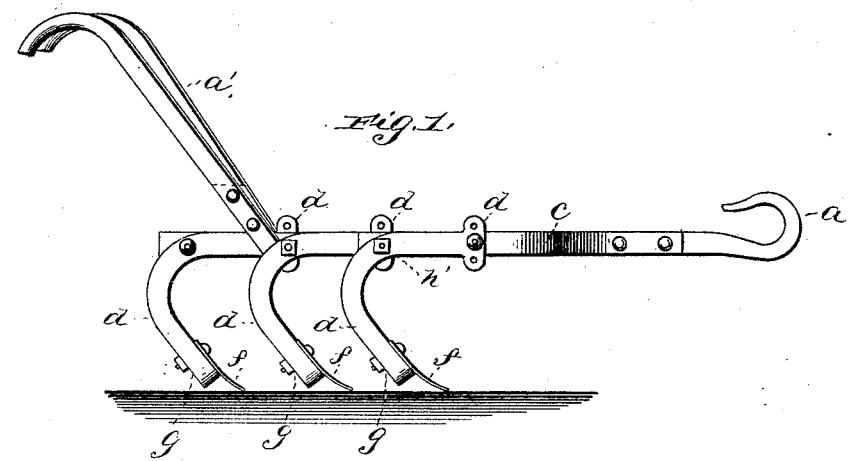
Figure 2:
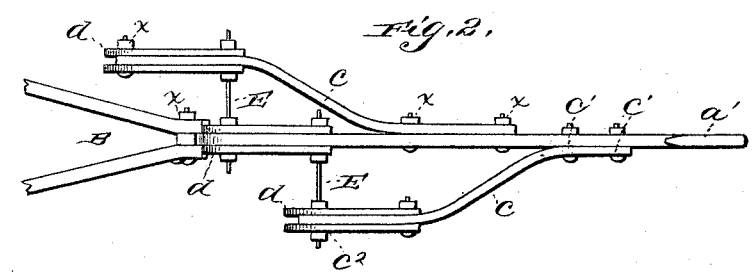
Figure 3:
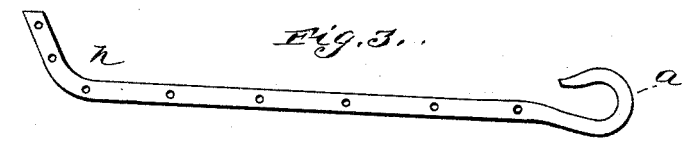
Fig. 3 shows the main beam with a draft device at *a*, and to the rear end *h* is attached handles, as shown at *a'*, Fig. 1, and fastened by two bolts.
Figure 6:
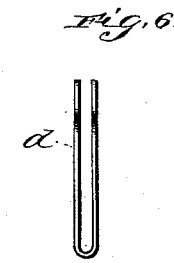

Fig. 6 is a rear view of same, showing slot through which passes the bolt to fasten on the plowshare or shovel, which can be moved up or down on the foot and fastened, as shown at *g g g* and *f f f*, Fig. 1.

By this construction I make a cultivator that is strong, light, and durable, and that is thoroughly interchangeable in its parts and can be used as a right, left, or breast cultivator, and by detaching the center foot as a right, left, or breast "double-foot" and by detaching the side beams as a light "single-foot" stock, and is readily adjusted to width of row or breast, the beams being held rigid apart.

I claim—

In an interchangeable cultivator, the combination of a central curved beam pierced with holes at intervals and upturned at its rear end with the curved or angular side bars bolted at their forward ends to the central bar and held at their ends by screw-threaded rods and spacing-nuts, and the curved double standards provided with adjusting-heads, whereby the pitch of said standards may be changed and the side bars adjusted longitudinally upon the center bar, substantially as shown and described.

WAVERLY C. MOORE.

Witnesses:
    LEE P. ORR,
    WILL. D. BRASHAM.